US008761742B2

(12) United States Patent
Varadarajan

(10) Patent No.: US 8,761,742 B2
(45) Date of Patent: Jun. 24, 2014

(54) SYSTEM AND METHOD OF TRANSMITTING A MESSAGE TO A CALLER

(76) Inventor: Kavita Varadarajan, Cupertino, CA (US)

( * ) Notice: Subject to any disclaimer, the term of this patent is extended or adjusted under 35 U.S.C. 154(b) by 820 days.

(21) Appl. No.: 12/416,982

(22) Filed: Apr. 2, 2009

(65) Prior Publication Data

US 2010/0255816 A1 Oct. 7, 2010

(51) Int. Cl.
*H04M 3/42* (2006.01)
*H04L 12/58* (2006.01)
*H04W 4/12* (2009.01)

(52) U.S. Cl.
CPC ............ *H04L 12/5855* (2013.01); *H04L 51/14* (2013.01); *H04L 12/5895* (2013.01); *H04W 4/12* (2013.01)
USPC ..... 455/415; 455/466; 455/412.1; 455/412.2; 455/414.1

(58) Field of Classification Search
CPC ... H04M 1/57; H04M 1/575; H04M 1/72552; H04M 2203/2011; H04M 3/42059; H04M 3/42085; H04M 3/42093; H04M 3/436; H04M 3/42042
USPC .................. 455/403, 414.1, 412.1–413, 26.1, 455/410–415, 466
See application file for complete search history.

(56) References Cited

U.S. PATENT DOCUMENTS

| | | | |
|---|---|---|---|
| 7,676,220 B2* | 3/2010 | Kuiken et al. | 455/412.2 |
| 8,000,685 B2* | 8/2011 | Benco et al. | 455/413 |
| 2007/0275698 A1* | 11/2007 | Kuiken et al. | 455/414.1 |
| 2007/0281759 A1* | 12/2007 | Choi | 455/575.1 |
| 2010/0035585 A1* | 2/2010 | Hadinata et al. | 455/413 |

* cited by examiner

*Primary Examiner* — Ronald Eisner
(74) *Attorney, Agent, or Firm* — Quinn Law Group, PLLC

(57) ABSTRACT

A method for generating a message using a phone includes recording messages and phone numbers in a database, assigning a message to one or more of the numbers, and comparing an incoming phone number with the numbers. The message is transmitted to a phone used for placing the incoming phone call when the incoming phone number is in the database. A system includes first and second phones, a database containing phone numbers and messages, a device for establishing communications between the phones, and an algorithm. The algorithm assigns an authorization code to some numbers in the database. The algorithm assigns the message to a phone number having the authorization code, and automatically compares the incoming phone number to the phone numbers in the database to determine if the authorization code has been assigned. The message is transmitted to the first phone when the incoming phone number has the authorization code.

10 Claims, 2 Drawing Sheets

US 8,761,742 B2

SYSTEM AND METHOD OF TRANSMITTING A MESSAGE TO A CALLER

TECHNICAL FIELD

The present invention relates generally to telephonic communication, and in particular to a system and a method for automatically generating and communicating a predetermined message to an originator of a phone call.

BACKGROUND OF THE INVENTION

The evolution of technology in the area of telephonic communication has resulted in the rapid development and use of mobile cellular phones, to the point that cell phone use is now almost universal. Cell phones were once relatively cumbersome devices, and were severely limited in function in comparison to the cell phones manufactured to the sophisticated technological standards of today. For example, evolving battery technology has enabled mass production of miniaturized cell phones, which are routinely provided to customers for a nominal cost by service providers in exchange for entering a service agreement of a specified term. As a result, the use of cell phones is no longer relegated to high-end consumers and business users. In many instances people are even forgoing the use of traditional hard-wired land lines in favor of cell phones.

A notable trend in telephonic communications enabled by the evolution of cellular phone technology is the rapidly expanding use of text messaging. Text messaging, also referred to simply as "texting", is a process of transmitting text-based messages from a cell phone or other portable electronic device using the Short Message Service (SMS). Texting has overtaken voice-based cell phone communications for interpersonal communications. According to Nielsen Mobile, a service of the Nielsen Company, by the second quarter of 2008 an average mobile or cellular phone subscriber placed or received 204 traditional voice calls, compared with sending or receiving 357 text messages. A typical teen in the United States currently sends or receives over 1,700 text messages per month, while making or receiving just over 200 voice calls. Clearly, texting has greatly expanded the available opportunities for people to stay in close communication. However, existing cell and landline phone technology remain somewhat limited in certain respects, for example in the potentially unsatisfactory response received by call originators whenever an intended call recipient is either unable or unwilling to receive an incoming call.

SUMMARY OF THE INVENTION

Accordingly, a method in the form of an algorithm is provided for use when a recipient of an incoming phone call is unable or unwilling to receive the call, as noted above. That is, certain scenarios exist wherein a user of a phone, whether configured as a cell phone or as a conventional landline phone, is preoccupied and therefore cannot or does not wish to receive the incoming call. By way of example, the user could be operating a vehicle in traffic, or performing another task in which the user's undivided attention is desirable. Likewise, the user could be a student attending a class or studying in a quiet environment such as a library, or a professional attending an important business meeting. In a more social setting, the user could be viewing a play or a film in a theater, dining out in a quiet restaurant, or participating in any other social event during which the user does not wish to answer the phone.

In any of these exemplary scenarios, the user would typically turn off the phone or silence the ringer, or simply hang up without answering if the phone does happen to ring. In any case, someone who tries to reach the user will be unable to do so, and will be unable to determine where the user is or what the user is presently doing. Depending on the situation, the caller might worry as a result of not being able to reach the user. For instance, a parent trying to reach a child or teenager could be somewhat alarmed when the child or teenager fails to answer the phone, particularly if such a result occurs repeatedly over an extended period, or when the child is otherwise expected to answer promptly.

Accordingly, execution of the algorithm embodying the method of the present invention provides the call initiator or caller with information relating to the user in the form of a predetermined message. The message informs the caller as to what the user is presently doing, where the user is, and/or why the user is presently unable to receive the incoming call, depending on how the user has configured the message. The message can be correlated or associated in a database with a phone number of the caller in order to ensure that the message is transmitted only to those callers that are pre-approved by the user. No message transmission, or alternately transmission of a more general or generic message, and/or relay of the call to the user's voice mail, can be the result when a caller that is not pre-approved attempts to reach the user.

That is, the message can be selectively modified or customized by the user in order to more appropriately match the identity of the caller. For example, a parent, sibling, spouse, or close friend could be provided with a message conveying specific information or information that more precisely details the user's location and present activity. Likewise, if the caller is a casual acquaintance or a stranger, information with a more appropriate level of precision could be provided. Callers that are not sufficiently close to the user can continue to receive no answer, a generic message, and/or be directed to the user's voice mail in the usual manner, at the user's discretion, as noted above.

In particular, a method for generating a predetermined message using a phone includes recording a set of messages and a set of phone numbers in a database accessible by the phone, assigning a predetermined message from the set of messages to at least one number of the set of phone numbers, and comparing an incoming phone number of a phone used for placing an incoming phone call with the set of phone numbers in the database. The method also includes automatically transmitting the predetermined message to the phone used for placing the incoming phone call when the incoming phone number is in the set of phone numbers.

A system includes a first and a second phone, a database in communication with the second phone and containing a set of phone numbers and a plurality of messages, a device for establishing a communications link between the first and second phone, and an algorithm. The algorithm is accessible by the second phone, and is adapted for assigning an authorization code to at least one phone number of the set of phone numbers in the database in response to an input signal from the second phone. The algorithm automatically compares an incoming phone number of the first phone to the set of phone numbers in the database to determine if the incoming phone number has been assigned the authorization code. The predetermined message is automatically transmitted to the first phone when the incoming phone number has been assigned the authorization code.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
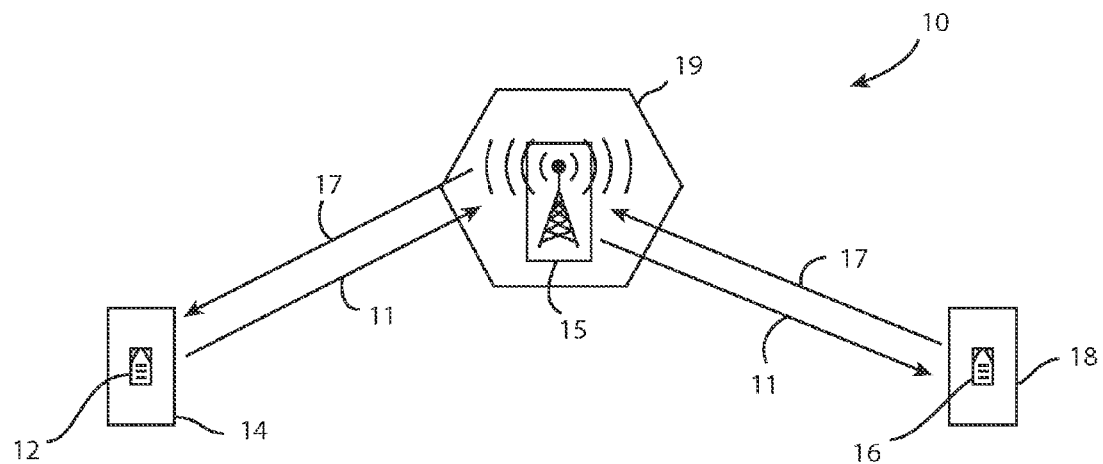
FIG. 1 is a schematic illustration of an exchange of information over an exemplary telephone network in accordance with the invention.

Referring to the drawings, wherein like reference numbers correspond to like or similar components throughout the several figures, and beginning with FIG. 1, an exemplary telephone network 10 enables communication between a pair of telephones or phones 12 and 16. In FIG. 1, the network 10 is exemplified as a mobile or cellular network, however a hardwired or landline network can also be used without departing from the intended scope of the invention. Likewise, while the phones 12 and 16 are each represented as mobile phones or cell phones for exemplary purposes, it will be clear from the disclosure herein that any suitably configured digital phone, including a landline phone, can also be used within the intended scope of the invention. That is, the structure and configuration of the phones 12, 16 must be conducive to execution of the method or algorithm 100 of FIG. 3 explained below, with the particular construct or configuration of the network 10 of FIG. 1 being that which is suitable for affecting a telephonic communication link between the phones 12, 16.

Within the network 10 of FIG. 1, the phone 12 is located in a first location 14, while the phone 16 is located in a second location 18 that is different from the first location 14. Telephonic communication between the phones 12 and 16, when the phones are configured as mobile or cellular phones as shown in FIG. 1, can be enabled by a cell tower 15 located in a particular cell 19, with the cell tower 15 being collocated with a suitable low-power transmission station or base station (not shown). Communication between the phones 12, 16 is thus relayed or transmitted via a number of cells such as the cell 19, using proximate cell towers 15, as will be understood by those of ordinary skill in the art.

While only one cell 19 is shown in FIG. 1 for illustrative simplicity, the network 10 of FIG. 1 can include any number of adjacent cells 19. The various cells can thus cooperate to provide wide cellular coverage over an area typically far greater than that of the cell 19 alone in order to allow the phone 12 and/or the phone 16 to travel outside of its respective location 14, 18, e.g., while a user of the phone 16 is driving or traveling over a considerable distance. Therefore, within the scope of the invention the locations 14 and/or 18 can change or remain fixed, without in any way altering the form or content of the communication occurring between the phones 12 and 16.

Regardless of the number of cells 19 used to affect communications between the phones 12 and 16, the phone 12 is in the possession of a first person, hereinafter referred to a call originator or caller. The phone 16 is in the possession of a second person, hereinafter referred to as a call recipient or user. Using the phone 12, the caller places an incoming call 11 to the user, with the term "incoming" as used herein referring to the perspective of the user and/or phone 16, i.e., an outgoing call from the perspective of the caller. When the network 10 is configured as a cellular network as shown in FIG. 1, the incoming call 11 is thus transmitted from the phone 12 via one or more cells 19 and cell towers 15, and the incoming call 11 is received by the phone 16 of the user. Without the user answering the incoming call 11, a predetermined message 17 is automatically generated or selected, and then transmitted back to the phone 16 for immediate or delayed display and/or playback to the caller on the phone 12 or another suitable device, as will now be explained with reference to FIG. 2.

Figure 2:
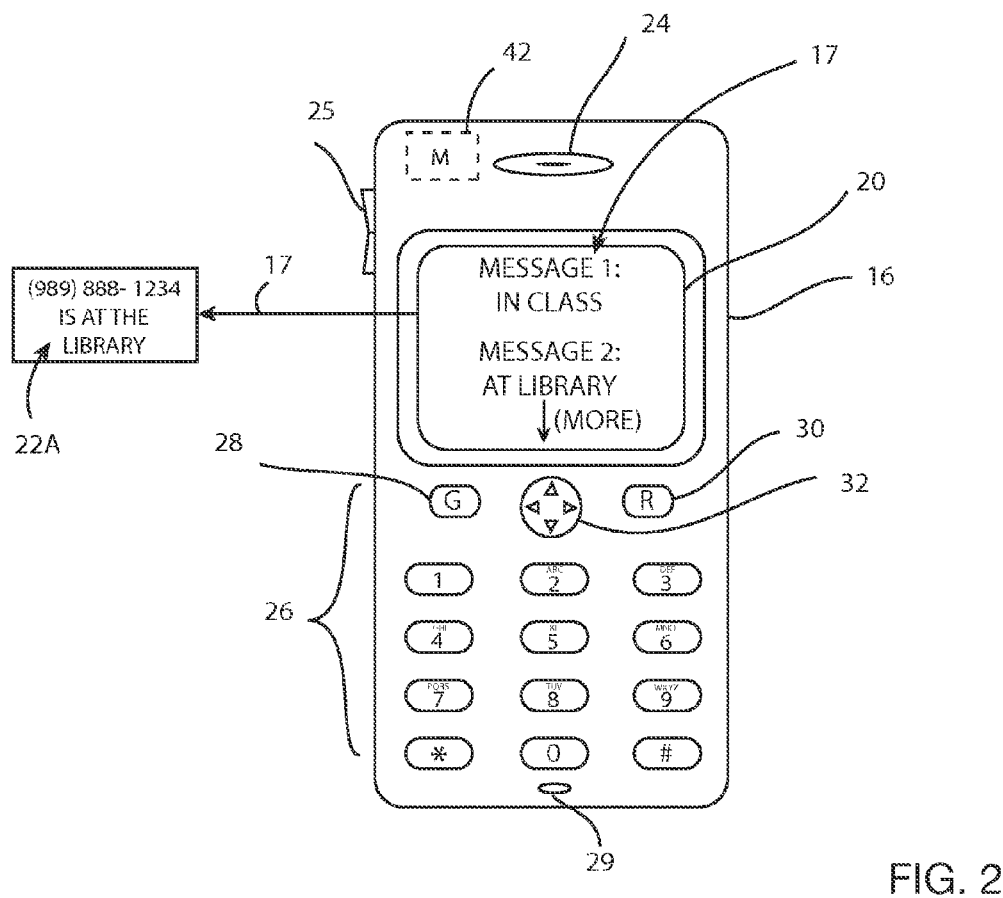
FIG. 2 is a schematic illustration of a phone that is usable for exchanging information over the exemplary telephone network shown in FIG. 1.

Referring to FIG. 2, the phone 16 can be adapted to transmit the predetermined message 17 in the form of an SMS text message and/or a voice message. The phone 16 includes a display screen 20 that is configured for displaying the message 17 to the user prior to a transmission of the message 17 to the caller. The phone 16 also includes a speaker 24 adapted for broadcasting sound received by the phone 16, a microphone 29 adapted for detecting and recording a voice message spoken by the user, a volume button 25, and any additional functional buttons or devices, such as a camera (not shown), necessary for providing the desired functionality of the phone 16.

For example, the phone 16 can include a set of alphanumeric buttons 26, i.e., 0-9, *, and # as shown in FIG. 2, as well as any number of additional functional keys or buttons, including but not limited to an "on", transmit, or send key 28, which is typically but not necessarily green in color, as indicated by (G) in FIG. 2. An "off" or "hang up" key 30 can also be provided, which is typically red in color as indicated by (R) in FIG. 2. A selection key 32 can include a set of directional arrows as shown to facilitate menu navigation when viewing any text or options displayed on the display screen 20.

Any of the buttons used with the phone 16 can be configured with conventional push buttons as shown. Alternately, the buttons can be configured in the form of a touch-activated keypad such as the type offered on the IPHONE available through APPLE, Inc., or any similar touch-screen text entry device. Alternately, the phone 16 can be configured with an integrated or separately attachable keyboard (not shown) to provide enhanced text messaging capabilities, for example a miniaturized integrated keyboard of the type used by BLACKBERRY-style devices.

Still referring to FIG. 2, within the intended scope of the invention the phone 16 can be programmed with any number of the predetermined messages 17. In one exemplary embodiment, a relatively small set of the messages 17 can be programmed or stored in memory (M) 42 of the phone 16 and indexed therein for ease of use, e.g., using a corresponding integer value or any other suitable alphanumeric code. An exemplary set of codes in the form of integers (1-7) could correspond to predetermined messages 17, each message 17 providing information about the user, such as: 1) in class; 2) at the library; 3) sleeping; 4) in a business meeting; 5) taking a shower; 6) in an airplane; 7) I will be free after 4 pm; etc. The total size (n) of the set of codes can vary, and the size (n) and any specific information contained in each of the messages 17 can be either factory preset or selectively modifiable or customizable by the user.

Before a user enters into any of the activities described in the various predetermined messages 17, the user can set the phone 16 in an automatic answer mode, and can press a corresponding key or sequence of keys for the particular message 17 the user wants to transmit to the caller. The user can then either switch off the phone 16 or leave it on, as explained below. Subsequently, if a caller dials the number of the user, a selected predetermined message 17 will be automatically transmitted to the caller, if the caller is one of the selected callers the user has chosen for receipt of the message 17. The message 17 in the form of SMS text can be displayed to the caller on a display screen 22A of the phone 12 (see FIG. 1) if the phone 12 is so equipped, or another associated device such as a display screen of an answering machine. In another embodiment, the message 17 can be broadcast to the caller via the caller's handset, i.e., via a microphone portion of the phone 12 similar to the microphone 29 of the phone 16 shown in FIG. 2.

In an exemplary embodiment, transmission of the predetermined message 17 can be restricted or limited to only selected callers, such as by associating the cellular or mobile number of the caller in memory 42 of the phone 16 with a permission key or one of the alphanumeric codes describing the various messages 17. For example, callers such as parents, siblings, spouses, and/or close friends could be granted permission by the user, thereby allowing these and only these users to receive a transmission of the message 17, while callers not selected by the user do not receive the message 17, or optionally receive a generic default message providing more general information about the user, or relaying the call to voice mail. Such an option can help to protect the security and privacy of the user at the user's sole discretion.

In another exemplary embodiment, instead of the phone 16 automatically answering the incoming call 11 (see FIG. 1) by way of transmitting a predetermined message 17, activation of the answering function can be manually performed by the user. For example, upon seeing that the phone 16 is actively ringing, the user of the phone 16 can press a designated button, e.g., the * or # button, or can click a symbol selected using the button 32, and thereby signal for transmission of the message 17 in that manner.

As noted above, the predetermined message 17 to the caller can be embodied as an SMS or as a machine-generated voice message. For example, the user can record or establish several different greetings, with a designated one of the unique greetings being selected by the user for play back or broadcast to a particular caller. The predetermined message 17 can be sent as an immediate response to the incoming call, i.e., in real time while the caller is still listening with the phone 12, or it can be an automated return call and/or SMS text transmitted to the caller. As explained above, the predetermined message 17 can be customized to a particular caller, such that the level of specificity of the information transmitted to a parent, spouse, or sibling can be different than that transmitted to others.

Figure 3:
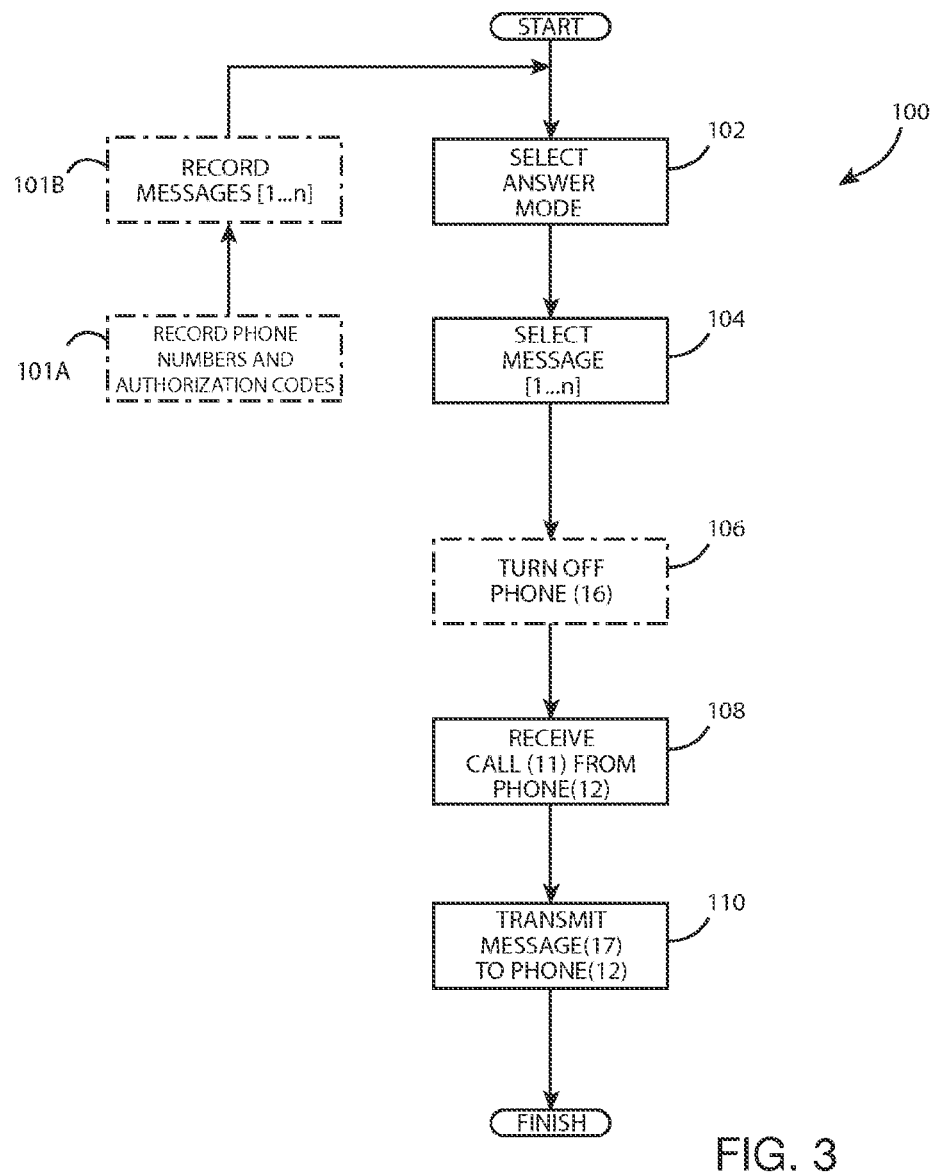
FIG. 3 is a graphical flow chart describing a method of communicating information in the form of a message between a call recipient or user and a call originator or caller.

Referring to FIG. 3, a method or algorithm 100 for transmitting a predetermined message 17 as set forth above can be programmed into a computer-readable medium for selective execution by a user. The algorithm 100 can exist in a variety of forms. For example, the algorithm 100 can exist as a software program or multiple software programs, including instructions in source code, object code, executable code, or other suitable formats, and recorded or written to a computer-readable medium. Such media can include, without being limited to, Random Access Memory (RAM), Read-Only Memory (ROM), Erasable Programmable ROM (EPROM), Electrically Erasable Programmable ROM (EEPROM), magnetic and/or optical tapes, disks, or other digital or analog devices. Such a medium is represented generally in FIG. 2 as the memory 42.

Beginning with step 101A, which is shown in phantom to indicate that step 101A is a preparatory step to steps 102-110 described below, the user records a set of phone numbers in the database 52 or 56. This set of phone numbers could be the user's personal address book, i.e., numbers of various family members, friends, acquaintances, businesses, coworkers, associates, etc. From this set of numbers, the user can assign an authorization code to one or more phone numbers in the set of phone numbers using the second phone. By assigning an authorization code, the user designates certain numbers as authorized numbers, such that authorized numbers are approved by the user for receipt of the predetermined message 17 as explained below.

At step 101B, the user records or selects a set of messages in the database 52 or 56, which is accessible by the phone 16. As noted above, the set of messages could be factory preset, and/or it can be an open set that the user can build and customize. The information to be conveyed by the predetermined message 17 selected from the set of messages can vary as set forth above, such as "in library", "in class", "in a meeting", "sleeping", "driving", etc., and therefore the set of messages can be as large as the user desires, bounded only by the size of the memory 42 (see FIG. 2).

Figure 4:
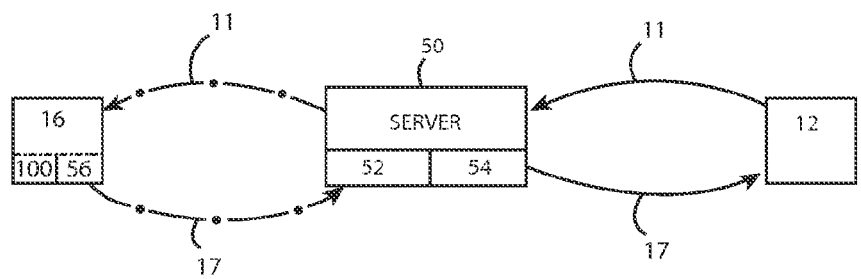
FIG. 4 is another schematic illustration of an exchange of information over the exemplary telephone network shown in FIG. 1.

At step 102, and with reference to the FIG. 4, the user can select an answer mode, i.e., a mode that automatically enables the transmission of the predetermined message 17 of FIGS. 1 and 2 as set forth above. Alternately, the user can opt for a manual mode wherein the user remains able to determine when the phone 16 is ringing, either by hearing a ring tone, sensing a vibration, or viewing a message on the display screen 20 of the phone 16. The algorithm 100 then proceeds to step 104.

At step 104, the user selects, designates, or otherwise assigns a corresponding code for a predetermined message 17, such as an integer. The predetermined message 17 can be selected from a previously recorded set (n) of such messages, represented in FIG. 3 as the integer set [1, . . . , n]. Selection at step 104 can be accomplished by pressing a designated key on the phone 16, or a sequence of keys as explained above with reference to FIG. 2. Prior to step 104, the user can set an authorization code for one or more stored phone numbers, e.g., a code designing certain callers as being authorized to receive a predetermined message 17. The algorithm 100 then proceeds to step 106, or directly to step 108 in another embodiment.

At step 106, the user of the phone 16 can turn off the phone 16 so that all subsequent steps occur without providing any notice to the user. For example, if the location 18 of FIG. 1 is a location in which the user does not wish to be disturbed, the user can simply turn off the phone 16. When the user switches off the phone 16, a message 17A can be sent to the service provider 50 instructing the service provider that the phone 16 remains in an "active phone" state.

The service provider 50 is expected to retain a database 52 of all currently active phones on the network 10 of FIG. 1. An entry in this database 52 will have, at a minimum, the phone number (#) 54 of the phone 16, which is in an active state, and the corresponding predetermined message 17. Alternately, a smaller database 56 can be written to or recorded on a physical memory device housed within the phone 16, e.g., the memory 42 (see FIG. 2). The database 52 and/or 56 contains a listing of all of the predetermined messages 17. Once the incoming call 11 has been placed and received by the phone 16 and/or a host machine or a server 50 of a service provider, the algorithm 100 proceeds to step 110.

At step 110, when a caller using the phone 12 places an incoming call 11 to the phone 16, the server 50 retrieves a corresponding message, i.e., the predetermined message 17, from the database 52 for that particular caller, and then transmits this predetermined message 17 to the caller for display on the phone 12 and/or for audio broadcast via the phone 12, without directly involving the user or the phone 16.

Alternately, the algorithm 100 does not involve the server 50 directly, but is instead embodied as software loaded within the phone 16 as represented in FIG. 4 by the phantom block 100. In the alternate embodiment, the predetermined message 17 is transmitted from the phone 16 to the phone 12 using the cell 19 and cell tower 15 of FIG. 1. In either embodiment, the user can use the phone 16 to assign an authorization code to one or more numbers in the database 52 or 56, with any number having an assigned authorization code being authorized for receiving a transmission of the message 17.

While the best modes for carrying out the invention have been described in detail, those familiar with the art to which this invention relates will recognize various alternative designs and embodiments for practicing the invention within the scope of the appended claims.

The invention claimed is:

1. A method for communicating a predetermined message to a first phone having an incoming phone number using a second phone, the method comprising:
   recording a set of text messages in a database that is accessible by the second phone;
   recording a set of phone numbers in the database;
   assigning an authorization code to at least one phone number in the set of phone numbers;
   automatically comparing, in response to an incoming call from the first phone, the incoming phone number of the first phone to the set of phone numbers in the database to thereby determine if the incoming phone number has been assigned the authorization code;
   determining whether a designated button of the second phone has been pressed while the second phone is receiving the incoming call from the first phone;
   displaying the recorded set of text messages on a display screen of the second phone;
   receiving, from a user of the second phone only when the designated button has been pressed, a manually-selected text message from the displayed set of text messages;
   receiving, when the designated button has not been pressed and the incoming phone number has been assigned the authorization code, a text message that is automatically selected by the second phone from the displayed set of text messages; and
   automatically transmitting the selected text message to the first phone in response to the received message selection.

2. The method of claim 1, wherein the recorded set of text messages in the database includes a text message containing information about at least one of the present location and the present activity of a user of the second phone.

3. The method of claim 1, wherein the database is a physical memory device housed within the second phone.

4. The method of claim 1, wherein receiving the message selection includes selecting an integer value from a displayed list of integer values, wherein each of the integer values corresponds to a different one of the recorded text messages.

5. The method of claim 1, wherein the first phone includes a display screen, and wherein automatically transmitting the recorded text message to the first phone includes displaying an SMS text message on the display screen of the first phone.

6. A system comprising:
   a first phone;
   a second phone having a display screen;
   a database in communication with the second phone, and containing a set of phone numbers and a plurality of text messages;
   a device configured to establish a communications link between the first phone and the second phone; and
   tangible memory on which is recorded instructions embodying an algorithm that is accessible by the second phone;
   wherein the second phone is configured to execute the recorded instructions to thereby:
      assign an authorization code to at least one phone number of the set of phone numbers in the database in response to an input signal from the second phone;
      assign at least one recorded text message to the at least one phone number having the authorization code;
      automatically compare, in response to an incoming call from the first phone, the incoming phone number of the first phone to the set of phone numbers in the database to determine if the incoming phone number has been assigned the authorization code;
      determine whether a designated button of the second phone has been pressed while the second phone is receiving the incoming call from the first phone;
      display, on the display screen on the second phone, a list of the at least one recorded text messages corresponding to the phone number;
      receive a manually-selected text message from the displayed list of text messages only when the designated button has been pressed;
      receive, when the designated button has not been pressed and the incoming phone number has been assigned the authorization code, a message that is automatically selected by the second phone from the displayed recorded set of text messages; and
      automatically transmit the received text message to the first phone.

7. The system of claim 6, wherein the first phone and the second phone are both configured as cell phones, and wherein the intermediary device is a cell tower and base station.

8. The system of claim 6, wherein the first phone includes a display screen configured for displaying the transmitted text message.

9. The system of claim 6, wherein the database is recorded within a digital memory device that is physically resident within the second phone.

10. The system of claim 6, wherein the device is a computer server of a service provider, and wherein the database is recorded within physical memory of the computer server.

* * * * *